Oct. 8, 1968  E. C. ZMUDA  3,404,657
CONCENTRIC KNOB DISPLAY ARRANGEMENT
Filed July 29, 1965
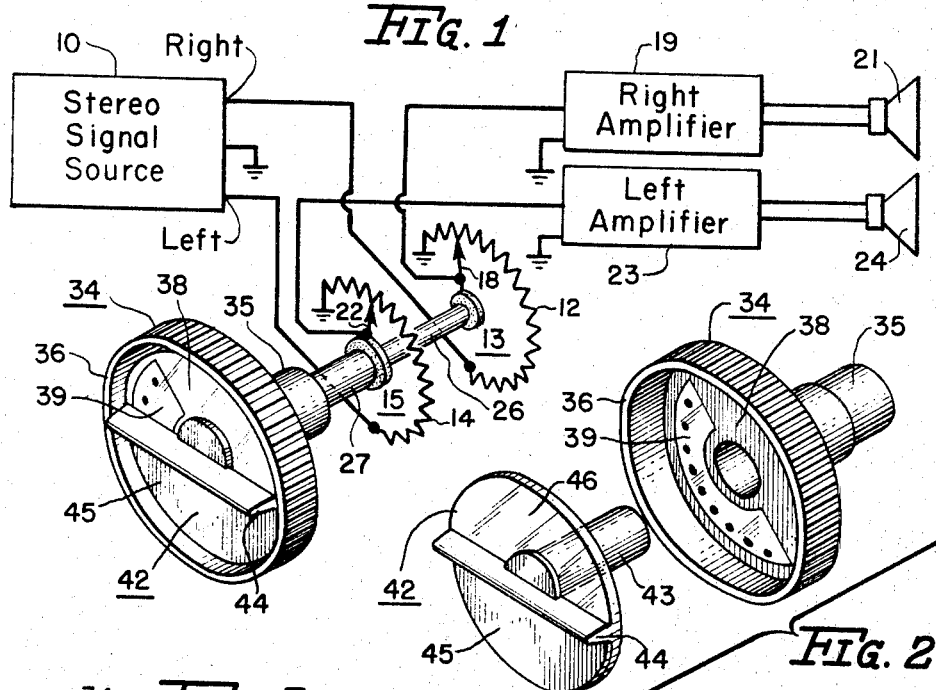
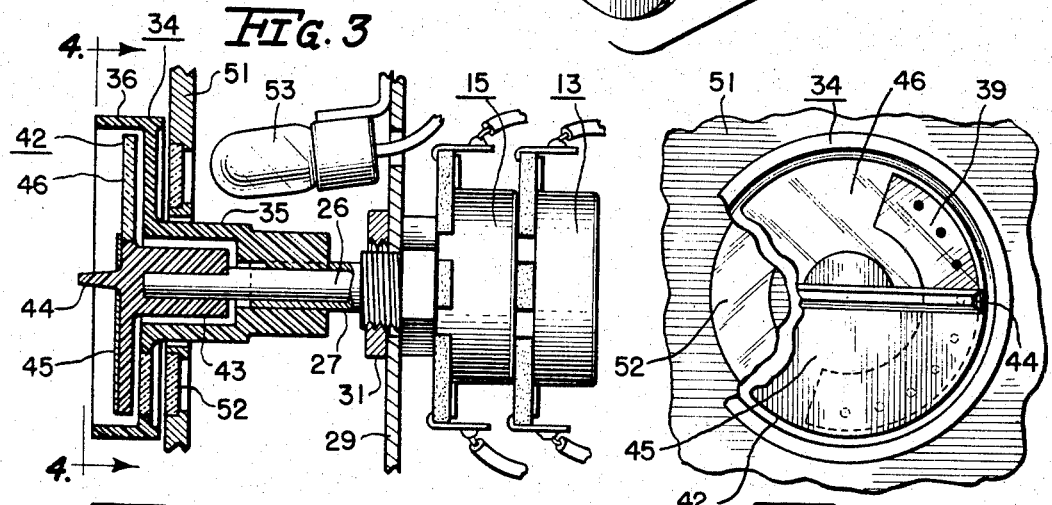
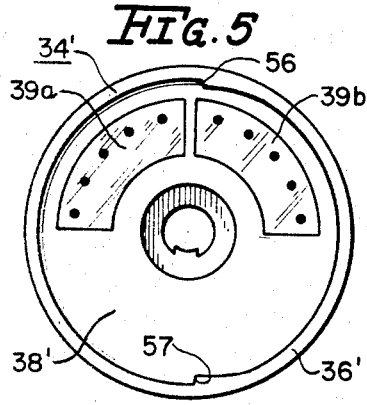
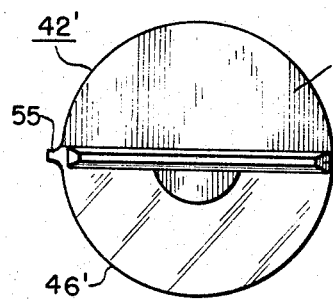
INVENTOR.
Edward C. Zmuda
BY James E. Tracy
Attorney

United States Patent Office 3,404,657
Patented Oct. 8, 1968

3,404,657
CONCENTRIC KNOB DISPLAY ARRANGEMENT
Edward C. Zmuda, Elmwood Park, Ill., assignor to Zenith Radio Corporation, Chicago, Ill., a corporation of Delaware
Filed July 29, 1965, Ser. No. 475,792
8 Claims. (Cl. 116—124.4)

ABSTRACT OF THE DISCLOSURE

An indication of the relative angular positions of a pair of concentric and independently rotatable inner and outer control shafts is obtained by affixing, to one end of the outer shaft, an outer knob a portion of which is disc shaped and has an arcuate display area of limited angular extent. Overlying the disc portion and affixed to one end of the inner shaft is an inner knob which includes an opaque portion and an arcuate light-transmitting portion of angular extent equal to that of the arcuate display area. The opaque portion, at different relative angular positions of the two knobs, covers different amounts of the display area. The uncovered part of the area is visible through the light-transmitting portion and its size indicates the relative difference between the individual positions of the two control shafts.

---

This invention relates to a concentric knob display assembly for indicating the relative angular positions of a pair of concentrically arranged, independently rotatable control shafts. The invention is particularly attractive when incorporated in a stereophonic sound reproducing system, and thus will be described in that environment.

Independently adjustable concentric or coaxial control shafts are usually employed to control related operating characteristics in a system. For example, in sound amplifying apparatus a pair of concentric shafts may conveniently be used to adjust a pair of circuit parameters which respectively alter the base and treble frequency response of the amplifying apparatus. As another example, a pair of coaxially arranged control shafts conveniently lend themselves to the adjustment of a pair of volume control potentiometers to independently adjust the loudness of the sound emanating from the two speakers in a stereo amplifying system.

In many such concentric shaft arrangements it is desirable that the adjustable knobs, employed to position the shafts, be appropriately indexed or marked so that the individual angular position of each of the two shafts, and consequently the adjustment of each of the two circuit parameters, is immediately apparent. On the other hand, there are times when an indication of the individual angular positions of two independently adjustable concentric shafts is of less importance than an indication of the relative difference between the individual positions. For example, when a pair of coaxial shafts respectively control the loudness of the sound produced by the left and right speakers in a stereo system, it is most helpful to have a knob display which clearly shows the relative angular positions of the two shafts. In other words, it is desirable to have a representation of the extent to which, and the direction (clockwise or counterclockwise) in which, one knob has been rotated with respect to the other from a predetermined reference orientation.

To explain, to achieve maximum listening enjoyment from a stereophonic sound system requires that the left and right amplifying channels be properly balanced in order that the sound delivered from the two speakers will be equalized. Balancing is usually obtained by ear by applying a monaural signal, namely the very same signal, to the input of each of the two amplifying channels and by independently adjusting the volume control potentiometers for the two channels until the sound outputs heard from the two speakers are equal. If the two amplifying channels and their associated volume control potentiometers and speakers were of identical construction and achieved identical performances in response to the same input signal, positioning of the two potentiometers to corresponding settings would result in equal sound outputs from the speakers. As a practical matter, however, the right and left channels are not perfectly matched and the two loudness controls must be adjusted to different settings to obtain balanced speaker outputs.

Even with perfectly matched amplifying channels the particular acoustics of the environment in which the speakers are disposed may require that one speaker be driven by a higher amplitude audio signal in order for that speaker to apparently produce the same output sound level as the other speaker. In that case, the volume controls would also have to be dissimilarly positioned.

Moreover, even with perfectly matched left and right channels and ideal acoustic conditions in the room or area in which the speakers are used, it may be that the listener is situated at some point in the room to the right or left of the central area between the speakers where stereo sound is customarily enjoyed. Under those circumstances, he may desire to increase the amplitude of the audio signal applied to the speaker remotest from where he is located in order that he will obtain a better balance of the two sound outputs. Again, this would require that different settings be employed for the two volume controls.

Generally, for any given stereo sound amplifying system the listener customarily initially balances the left and right speaker sound outputs by independently adjusting the two volume controls. Once the system is balanced, from then on it is merely necessary to rotate the two concentric loudness control knobs concurrently or in unison when it is desired to raise or lower the output sound level. Usually, there is sufficient friction between the inner and outer shafts so that when the outer knob only is adjusted the inner knob will follow. In this way, concurrent adjustment of the volume controls is achieved by rotating only the outer knob. Since the volume control potentiometers are usually set differently with the system balanced, the two concentric control shafts for the potentiometers assume different angular positions with respect to the same reference and these positions vary with different loudness settings. However, the relative angular position of each concentric shaft with respect to the other does not change when the shafts are rotated in unison. Hence, when the system is balanced a given angular relationship exists between the shafts and it is important that this relationship is not disturbed when loudness adjustments are made. If it is, the listener must again balance the system by ear.

Applicant's concentric knob arrangement displays a representation of the angular relationship between the two shafts. Once the system is initially balanced, the display may be mentally noted so that if the desired angular relationship between the shafts is ever upset it is a relatively simple matter to readjust the knob arrangement in order to return to the optimum relationship between the setting of the two volume controls.

Accordingly, it is an object of the present invention to provide a new and improved knob display arrangement.

It is a particular object of the invention to provide a novel concentric knob display assembly for indicating the relative angular positions of a pair of concentrically arranged, independently rotatable inner and outer control shafts.

A knob display assembly, constructed in accordance with one aspect of the invention, comprises a rotatable outer knob, including a display area, affixed to the outer shaft to facilitate positioning thereof. There is a rotatable inner knob, affixed to the inner shaft to facilitate positioning thereof, having an opaque portion which at different relative angular positions of the inner and outer knobs covers a different amount of the display area. The uncovered part of the display area is visible and varies in size with different relative positions of the knobs to indicate the relative difference between the individual positions of the inner and outer control shafts.

The features of this invention which are believed to be new are set forth with particularity in the appended claims. The invention, together with further objects and advantages thereof, may best be understood, however, by reference to the following description in conjunction with the accompanying drawing, in which:

FIGURES 1–4 illustrate a concentric knob display assembly incorporated in a stereo amplification system and constructed in accordance with one embodiment of the invention; and, FIGURES 5 and 6 depict a knob display arrangement which is a modification of that shown in FIGURES 1–4 and illustrate another embodiment of the invention.

Turning now to the embodiment of FIGURES 1–4, block 10 represents a source of right and left stereo signals and may comprise a pick-up cartridge of a stereo phonograph or a stereo frequency modulation radio receiver which is capable of detecting and separating left and right stereo signals carried over a single FM transmitting channel. Stereo signal source 10 has three output terminals designated Right, Left and Common. The right stereo signal appears between the Right terminal and the Common terminal, which is grounded, while the left stereo signal appears between the Left output terminal and the Common terminal or ground. The Right terminal is connected to one terminal of the resistance element 12 of a volume control potentiometer 13, the other terminal of which is connected to ground. Similarly, the Left output terminal of source 10 is connected to the resistance element 14 of a volume control potentiometer 15, the other terminal of which is grounded.

The movable contact or variable tap 18 of potentiometer 13 is conected to one input of a right amplifier 19, the other input of the amplifier being grounded. Amplifier 19 is capable of amplifying an applied audio signal and may contain one or more amplifying stages. The output of amplifier 19 is connected to a right speaker 21.

In like manner, the variable tap 22 of potentiometer 15 connects to one input terminal of a left audio amplifier 23, of one or more stages, the other input of which is grounded. The output terminals of amplifier 23 are coupled to a left speaker 24.

The right stereo signal developed by source 10 appears across resistor 12 and the amplitude of that signal applied to amplifier 19 is determined by the setting of tap 18. Movement of tap 18 toward the ungrounded terminal of resistor 12 increases the amplitude of the right stereo signal applied to amplifier 19. Potentiometer 15 functions in similar manner with respect to the left signal.

Potentiometers 13 and 15 are mounted back to back, as shown in FIGURE 3, and are respectively controlled by a pair of concentrically arranged, independently rotatable inner and outer control shafts 26, 27 in conventional manner. The assembly of the two potentiometers and their control shafts is mounted to a support member or panel 29 by the well-known expedient of a captivating nut 31.

A rotatable outer knob 34 has a hub portion 35 which is affixed to outer shaft 27. Specifically, the outer shaft has a nonsymetrical cross-sectional configuration while the bore of hub portion 35 has a mating configuration so that knob 34 is keyed to the outer shaft. Knob 34 also has an annular rim portion 36 which may be gripped and manually rotated to effect concurrent rotation of outer shaft 27.

Outer knob 34 also includes, between the rim and hub portions, a flat circular disc portion which is essentially divided into two semi-circular display sections each presenting a different visual appearance. Specifically, area or section 38 of knob 34 may be of one color, such as silver, and opaque, while display section 39 may be of another color, such as yellow, and may be made of a plastic that is at least partially transparent. A series of marking dots may also be disposed on arcuate display area 39 for reasons to be made apparent.

A rotatable inner knob 42 has a hub portion 43 which is affixed to inner shaft 26 by the expedient of providing a flat on the shaft and shaping the bore of hub 43 to have a mating cross-sectional configuration. With the exception of hub 43, inner knob 42 essentially comprises a flat circular disc whose diameter is less than the diameter of the rim 36 of outer knob 34 so that the disc portion of knob 42 may be disposed within rim 36. Knob 42 has a ridge 44 which bisects the circular disc portion into two half circles and provides a means by which inner knob 42 may be gripped and manually rotated to achieve concurrent rotation of inner shaft 26.

Knob 42 is made opaque over 180° while the other 180° half-circular section, with the exception of the area defined by hub 43, is made light-transmitting or transparent. Specifically, portion 45 is opaque while arcuate portion 46 is transparent. For convenience of manufacturing, the entire knob 42 may be made of a transparent plastic and the areas to be made opaque may be sprayed or coated with an opaque material. Preferably, opaque portion 45 constitutes a metallic silver lamination to match the silver appearance of display section 38.

Means are provided for illuminating part of all of arcuate display area 39. More particularly, a panel 51 which is parallel and spaced apart from support member 29 is apertured to accommodate the hub portion of outer knob 34. Panel 51 is opaque and is provided with a cut-away portion in which is disposed a flat ring 52 of phenolic or frosted plastic. Behind one point of the ring is a light source 53 which is fixedly mounted to support member 29. When light source 53 is illuminated, light is diffused throughout frosted ring 52 so a ring of light appears immediately behind display sections 38 and 39.

In the operation of the embodiment of FIGURES 1–4, since each of knobs 34 and 42 is independently rotatable those knobs are individually adjusted by the listener for both the desired loudness of the sound emanating from the two speakers 21 and 24 and also for the desired balance between the speaker outputs. As viewed in FIGURE 1, clockwise rotation of knob 34 rotates tap 22 of potentiometer 15 in a clockwise direction, with the result that the amplitude of the left audio signal applied to left amplifier 23 is increased. Similarly, clockwise rotation of inner knob 42 effects clockwise rotation of tap 18 of loudness control potentiometer 13 with the result that the amplitude of the audio signal applied to right amplifier 19 is increased.

If the two amplifying channels are perfectly matched and variable taps 22 and 18 are positioned at corresponding points on their respective potentiometer resistors, sound of equal loudness will be produced by speakers 21 and 24 in response to the same monaural signal produced at the Right and Left output terminals of stereo signal source 10. Knobs 34 and 42 are so indexed to their respective control shafts that when potentiometers 13 and 15 are similarly positioned opaque portion 45 of inner knob 42 completely covers arcuate display area 39 of outer knob 34. As a consequence, for that particular angular orientation of the inner and outer knobs, which may be considered a reference orientation, no part of display section 39 is visible through arcuate light-transmitting portion 46. Since both display section 38 and opaque portion 45 are preferably of the same color to provide the same appearance, the concentric knob arrangement is essentially of one color when the potentiometers are identically set.

As mentioned previously, the desired balancing of speaker outputs more than likely will be obtained by establishing potentiometers 13 and 15 at dissimilar positions. In that case, the relative angular position of one knob with respect to the other knob will vary from the reference orientation. This causes part of display section 39 to become visible through transparent portion 46, as seen in FIGURES 1 and 4. The size of the uncovered part of display area 39 is proportional to the relative difference between the individual positions of knobs 34 and 42, with respect to the same reference, thereby indicating the relative difference between the individual positions of the control shafts. The particular part of display section 39 that is uncovered also provides an indication as to which of the potentiometers is set at a higher position. As shown in FIGURE 1, outer knob 34 has adjusted potentiometer 15 to a higher setting than that of potentiometer 13, while in FIGURE 4 inner knob 42 has established potentiometer 13 at a higher setting than potentiometer 15. In FIGURE 1, outer knob 34 has been rotated clockwise with respect to inner knob 42 away from the reference orientation, while in FIGURE 4 knob 42 has been rotated clockwise relative to knob 34 away from the reference orientation.

When balance is established, the listener makes a mental note of the size of the uncovered part of display area 39 in order that balance can always be conveniently obtained at a later time in the event that one of the knobs is rotated without concurrently rotating the other. Preferably, the concentric shafts are arranged in conventional fashion so that outer shaft 27 has a degree of frictional contact with inner shaft 26. In this way, when the listener grips rim 36 and rotates knob 34, shaft 26 will be rotated in unison with shaft 27 and the exposed part of display section 39 will remain of the same size. Hence, any time it is desired to change the loudness of the two speaker outputs while maintaining balance, it is merely necessary to rotate the outer knob only.

Light source 53 illuminates frosted plastic ring 52 so that the exposed part of display section 39 will be illuminated. While such illumination is advantageous in that the display section is clearly visible in a darkened room, it is obviously not necessary. Display sections 38 and 39 need only present different visual appearances.

Moreover, it is not essential that inner knob 42 include transparent portion 46. That portion may be removed entirely and that knob may consist merely of opaque portion 45 and hub 43.

To summarize the embodiment of FIGURES 1–4, a concentric knob display assembly is provided for indicating the individual and relative angular positions of a pair of concentrically arranged, independently rotatable inner and outer control shafts 26, 27. A rotatable outer knob 34 is affixed to outer shaft 27 to facilitate positioning thereof and this knob includes an arcuate display area 39 of limited angular extent, specifically 180°, which assumes different angular positions with respect to a reference as the outer knob is adjusted. A rotatable inner knob 42, which is affixed to inner shaft 26 to facilitate positioning thereof, has an opaque portion 45 which assumes different angular positioned with respect to the same reference as the inner knob is adjusted and which, at different relative angular positions of the inner and outer knobs, covers different amounts of display area 39. The angular position of the uncovered and visible part of display section 39 is determined by the individual positions of the knobs thereby indicating the individual positions of the inner and outer control shafts, while the size of the uncovered part is determined by the relative difference between the individual positions of the knobs thereby indicating the relative difference between the individual positions of control shafts 26 and 27.

In some applications of the invention it will probably never be necessary to vary the relative positions of the two knobs by more than 90° in either direction from the predetermined reference orientation. FIGURES 5 and 6 respectively illustrate modifications of outer knob 34 and inner knob 42 and provide an arrangement for clearly indicating the direction or sense of deviation of the knobs from the reference orientation. Essentially, outer knob 34' of FIGURE 5 has its counterpart display section 39 broken up into two 90° segments labeled 39a and 39b. Display sections 39a and 39b may be made of at least partially transparent plastic and each should preferably be tinted of a different color. For example, section 39a may be red while section 39b may be green.

Inner knob 42' may be of similar construction as knob 42, with opaque portion 45', transparent portion 46', and gripping ridge 44' corresponding to the similarly, but unprimed, numbered elements of knob 42. Knob 42' of FIGURE 6 differs from knob 42 only in the provision of a projecting tab or portion 55. The internal wall of rim 36' of knob 34' is so shaped to provide two abutment shoulders 56 and 57 for tab 55 which limit the extent of rotation of knob 42' with respect to outer knob 42' to 180°.

When knob 42' is so positioned with respect to knob 34' that opaque portion 45' completely covers both display sections 39a and 39b, projecting tab 55 is positioned on the left side of knob 34' and midway between soulders 56 and 57. When the knobs are so relatively positioned, the potentiometers are identically adjusted. If a condition of balance requires that inner knob 42' be rotated clockwise with respect to outer knob 34', a part of red appearing display section 39a reveals itself through transparent portion 46'. On the other hand, if to obtain balance of the stereo system it is necessary to rotate knob 42' counterclockwise with respect to knob 34', a part of green appearing display section 39b becomes visible through transparent section 46'. Hence, breaking up of display section 39 into two sections of different colors assists the listener in recalling whether a condition of balance requires that the inner knob be rotated clockwise or counterclockwise with respect to the outer knob from that predetermined orientation in which all of display section 39 is covered.

While particular embodiments of the invention have been shown and described, modifications may be made, and it is intended in the appended claims to cover all such modifications as may fall within the true spirit and scope of the invention.

I claim:
1. A concentric knob display assembly for indicating the relative angular positions of a pair of concentrically arranged, independently rotatable inner and outer control shafts, comprising:
 a rotatable outer knob affixed to one end of said outer shaft to facilitate positioning thereof and including a disc portion having an arcuate display area of limited angular extent;
 and a rotatable inner knob overlying said disc portion and affixed to one end of said inner shaft to facilitate positioning thereof and including an opaque portion and an arcuate light-transmitting portion of limited angular extent,
 said opaque portion, at different relative angular positions of said inner and outer knobs, covering different amounts of said display area, the uncovered part of said area being visible through said light-transmitting portion and having a size indicative of the relative difference between the individual positions of said inner and outer control shafts.

2. A concentric knob display assembly according to claim 1 in which the angular extent of said light-transmitting portion is at least equal to that of said display area.

3. A concentric knob display assembly according to claim 1 in which said opaque portion covers the entirety of said display area when said inner and outer knobs are relatively positioned to a predetermined angular orientation.

4. A concentric knob display assembly according to claim 1 in which the size of the uncovered part of said display area is directly proportional to the relative difference between the individual positions of said inner and outer control shafts.

5. A concentric knob display assembly according to claim 1 in which the uncovered part of said display area is arcuate shaped, one end of the uncovered part indicating the individual angular position of said outer shaft while the other end indicates the angular position of said inner shaft.

6. A concentric knob display assembly according to claim 1 in which both said display area and light-transmitting portion are semi-circular.

7. A concentric knob display assembly according to claim 1 in which said light-transmitting portion is made of a transparent plastic.

8. A concentric knob display assembly according to claim 1 and including means for illuminating the uncovered part of said display area.

References Cited

UNITED STATES PATENTS

| | | | |
|---|---|---|---|
| 1,401,315 | 12/1921 | Clark | 73—114 |
| 1,629,680 | 5/1927 | Cooke | 116—114 |
| 2,236,132 | 3/1941 | Braidwood | 116—133 |
| 2,759,447 | 8/1956 | Helgeby | 116—116 |
| 2,917,981 | 12/1959 | Sewig | 116—133 XR |
| 3,232,401 | 2/1966 | Jones | 116—133 |

FOREIGN PATENTS

| | | |
|---|---|---|
| 443,121 | 2/1936 | Great Britain. |
| 599,977 | 3/1948 | Great Britain. |
| 372,993 | 12/1963 | Switzerland. |

LOUIS J. CAPOZI, *Primary Examiner.*